INVENTOR.
HENRY J. FLAIR
BY O.C. Hodges
Harvey A. David
ATTYS.

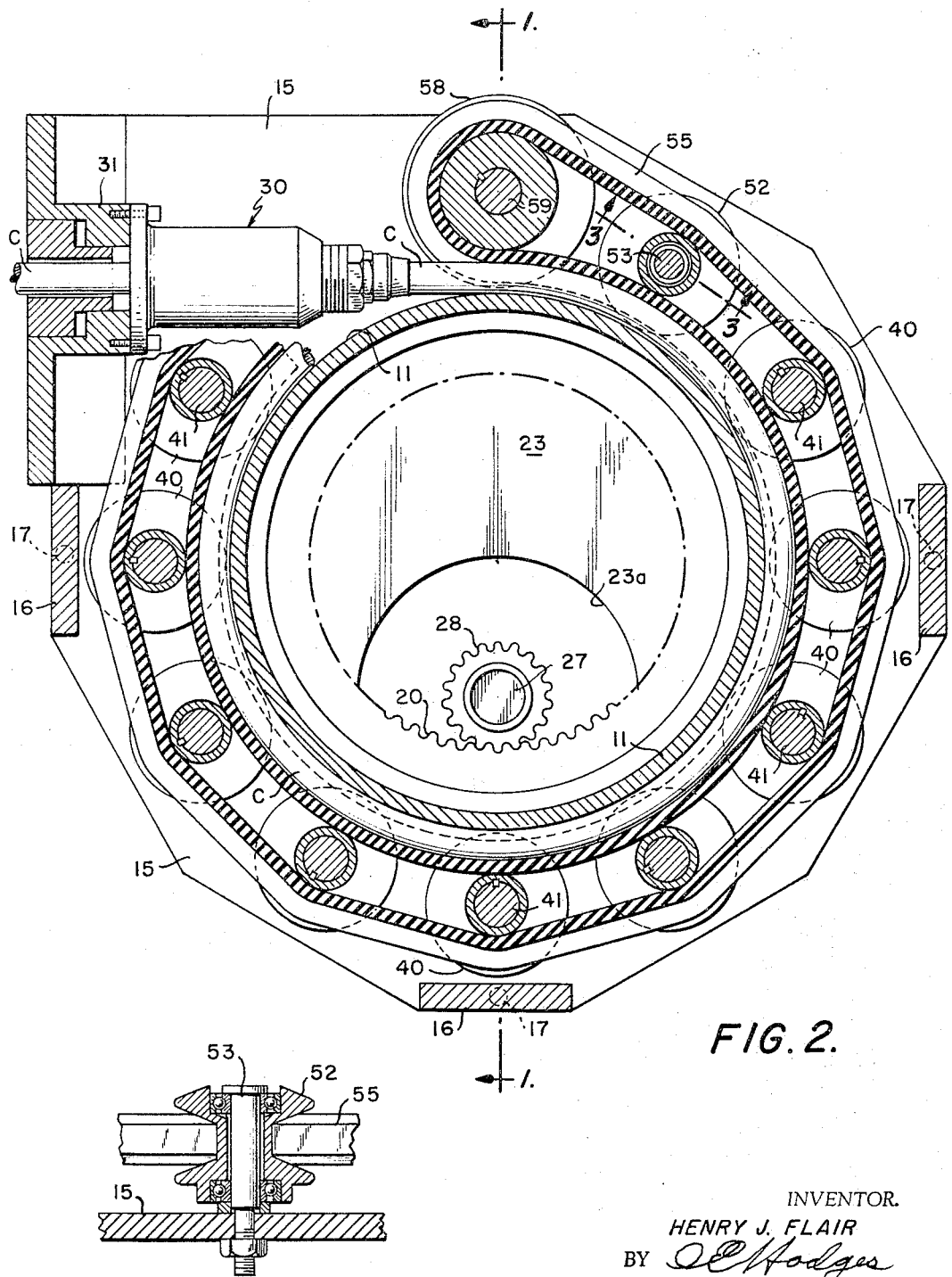

United States Patent Office 3,329,406
Patented July 4, 1967

3,329,406
PUSH-PULL CAPSTAN TYPE CABLE DRIVE
Henry J. Flair, Franklin Park, Ill., assignor, by mesne assignments, to the United States of America as represented by the Secretary of the Navy
Filed July 12, 1965, Ser. No. 471,486
6 Claims. (Cl. 254—175.3)

This invention relates to cable drives and more particularly to an improved capstan type cable drive capable of pushing as well as pulling a cable.

It is one object of this invention to provide an improved cable pushing and pulling capstan capable of handling cable having a relatively soft insulating covering without subjecting the cable to undue distorting forces such as pinching, stretching or the like which would be likely to injure the cable.

Another object of this invention is the provision of a pushing and pulling capstan type of cable drive which requires a minimum amount of maintainance and yet is reliable in performance.

As another object this invention aims to provide a capstan cable drive which is notably smooth and quiet in operation making it suitable for use in submarines and the like where quiet operation is important.

Yet another object of the invention is the provision of a novel cable drive of the foregoing characteristics comprising a drum about the outer surface of which several cable turns are wound and an endless belt which is carried by a plurality of driven sheaves arranged in a planetary fashion about the drum so that the belt defines a spiral or helical confining surface which imparts moving force to the cable during pushing operation.

Other objects and advantages of the invention will become apparent from the following detailed description of a preferred embodiment thereof read in conjunction with the accompanying sheets of drawings forming a part of this specification, and in which:

FIG. 2 is a sectional view of the capstant of FIG. 1 taken substantially along line 2—2 thereof; and FIG. 3 is a fragmentary sectional view illustrating an idler sheave and taken substantially along line 3—3 of FIG. 2.

Figure 1:
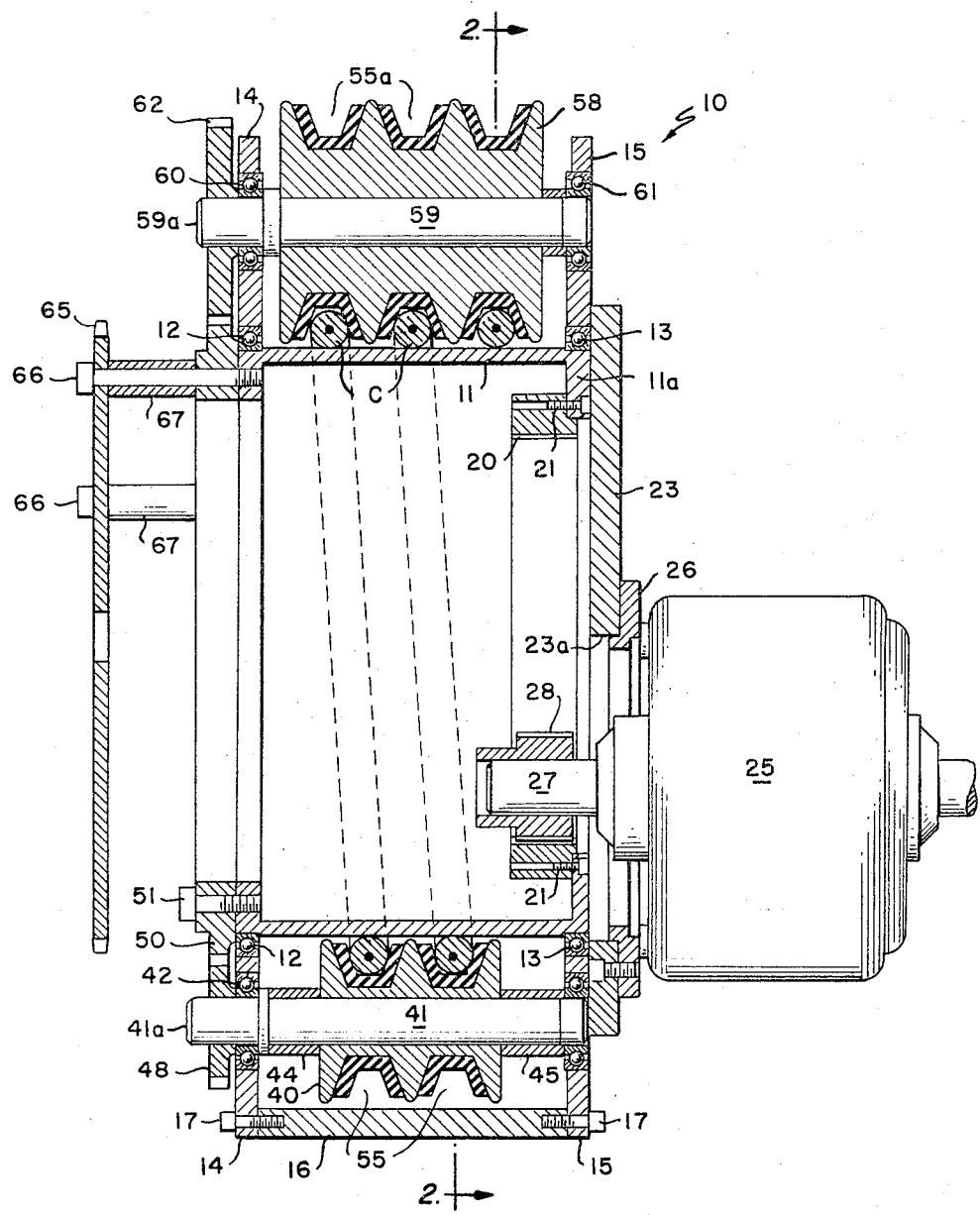
FIG. 1 is a vertical sectional view of a cable pushing and pulling capstan embodying the invention.

In the form of the invention illustrated in the drawings and described hereinafter, there is provided a cable pushing and pulling capstan generally indicated at 10. The capstan 10 comprises a cylindrical drum 11 on which are wrapped several turns of a cable C which is to be acted upon by the capstan. The drum 11 is mounted for rotation about its central axis by ball bearing means 12 and 13 carried by spaced, parallel frame plates 14 and 15, respectively, the spacing between the frame plates being conveniently maintained by spacer blocks 16 secured therebetween as by screws 17.

The drum 11 has an inturned flange 11a to which an internal ring gear 20 is secured by screws 21. A cover plate 23 is fixed to the frame plate 15 and has an opening 23a to the interior of the gear 20.

Rotation of the drum 11 is effected through suitable power transmission means schematically indicated at 25. The transmission means 25 is conveniently mounted on the cover plate 23 by an adapter ring 26 and has an output shaft 27 projecting through the opening 23a. A pinion 28 is fixed to the shaft 27 and is in driving engagement with the ring gear 20. It will be understood that the transmission means 25, which forms no part of the invention per se, is preferably operable to effect rotation of the drum 11 in either direction depending upon whether the cable is to be pushed or pulled, for example through a through-hull seal generally indicated at 30.

Again, it will be understood that the seal 30 forms no part of this invention, the seal itself being the subject of a copending patent application Ser. No. 471,482, filed July 20, 1965. Suffice it to say that the seal 30 is mounted between the frame plates 14 and 15, for example on a hull member 31 through which the cable is to be transferred.

Mounted in a planetary fashion about the drum 11 and between the frame plates 14, 15 are a plurality of gear driven double sheaves 40. Each double sheave 40 is keyed as shown in FIG. 2 to a shaft 41 which is journalled at opposite ends in suitable bearings 42, 43 carried by the frame plates 14, 15, respectively. The sheaves 40 are positioned between the frame plates on their respective shafts 41 by spacers 44, 45 which vary progressively in length going about the drum 11 so that the sheaves 40 lie along a helical path corresponding to the helical turns of the cable C on the drum 111.

Each of the shafts 41 has an end 41a extending through the frame plate 14 and has fixed on that end a pinion 48 in driven engagement with an external ring gear 50 secured to the drum 11 as by screws 51.

An unkeyed, undriven single sheave 52 is mounted on one of the frame plates 14, 15 on a stub shaft 53 to provide clearance for the standing part of the cable C leading to a supply or take up reel (not shown). This sheave acts as an idler to provide cross-over for the end loop of the belt 55 on three-groove sheave, and may advantageously be adjustable to vary the tension on the belt running on the sheaves 40, sheave 52 and a triple sheave 58, about to be described. Such adjustment may be conveniently attained, for example, by providing a shaft 53 which is mounted for eccentric movement.

The triple sheave 58, which accommodates the end loops or bights of the V belt 55 as well as the center courses thereof, is disposed between frame plates 14, 15 and keyed on a shaft 59 journalled in bearings 60, 61 carried by the frame plates. One end 59a of the shaft 59 projects through the frame plate 14 and has fixed thereon a pinion 62 in driven engagement with the ring gear 50. It will be noted from FIG. 1 that the triple sheave has an effective diameter which is larger than that of the other driven sheaves and that the pinion 62 is proportionately larger than the pinions 48, so that the linear speed at which the triple sheave attempts to drive the belt will equal that of the double sheaves.

The V belt 55 is characterized by a groove 55a in its outer surface, that is to say the surface which is always directed away from the sheaves.

Because the sheaves are positioned by their spacers 44, 45 to follow the helical path of the cable turns, the belt 55 running thereon has an inner helical course which overlies the cable C and presents the groove 55a thereof toward the drum 11. The cable C is thereby confined in the groove 55a and the belt 55 provides continuous guiding and confining engagement with the turns of the drum. Accordingly, when the drum 11 is driven in a direction to push the cable C through the seal 30 the belt 55 transmits driving force to the cable throughout the length of the cable turns, thereby avoiding any pinching stretching or other localized forces on the cable which would be likely to injure it.

The capstan 10 may be conveniently provided with a sprocket 65 mounted for rotation with the drum 11 by screws 66 and spacers 67, the sprocket being useful for driving associated devices such as a cable supply and take up reel (not shown). Other auxiliary devices such as an indicator (not shown) of cable travel may be driven from any of the shafts 41.

From the foregoing detailed description of a capstan embodying the invention it will be appreciated that there has been provided thereby an improved capstan which satisfies the aforementioned objects and advantages, as well as others apparent from the description.

Although the invention has been described in considerable detail with reference to a particular capstan embodying the invention it will be understood that the invention is not limited thereto, rather the invention includes all those modifications, adaptations, substitutions and uses as are reasonably embraced by the scope of the claims hereof.

What is claimed is:

1. A capstan for pushing and pulling drive of a cable, said capstan comprising:
   a drum;
   means supporting said drum for rotation about its central axis;
   a plurality of sheaves disposed about said drum and supported by said means for rotation about axes parallel to said central axis;
   means for spacing said sheaves along said axes parallel to said central axes so that an endless belt running on said sheaves presents a surface toward said drum along a helical path;
   said belt confining a cable when wound about said drum along said path; and
   means for driving said sheaves upon rotation of said drum.

2. A capstan as defined in claim 1 and wherein said means for driving said sheaves comprises meshing gear means connected to said drum and said sheaves, respectively.

3. A capstan for pushing and pulling drive of a cable, said capstan comprising:
   a cylindrical drum;
   frame means supporting said drum for rotation about its central axis;
   a plurality of sheaves disposed in planetary fashion about said drum and supported on shafts by said frame means for rotation about axes parallel to said central axis;
   means for spacing said sheaves along said axes parallel to said central axes so that an endless belt running on said sheaves presents a surface toward said drum along a helical path;
   said belt confining a cable when wound about said drum along said path; and
   means for driving said sheaves upon rotation of said drum.

4. A capstan as defined in claim 3 and wherein said means for driving said sheaves comprises meshing gear means connected to said drum and said shafts, respectively.

5. A capstan for pushing and pulling drive of a cable, said capstan comprising:
   a drum;
   means supporting said drum for rotation about its central axis;
   a plurality of sheaves disposed about said drum and supported by said means for rotation about axes parallel to said central axis;
   an endless belt running on said sheaves and presenting a surface toward said drum along a helical path for confining a cable when wound about said drum along said path;
   said sheaves having grooved sections thereon to receive said belt, one of said sheaves having one more grooved section than the other sheaves to accommodate the opposite end loops of said belt; and
   means for driving said sheaves upon rotation of said drum.

6. A capstan for pushing and pulling drive of a cable, said capstan comprising:
   a cylindrical drum;
   frame means supporting said drum for rotation about its central axis;
   a plurality of sheaves disposed in a planetary fashion about said drum and supported on shafts by said frame means for rotation about axes parallel to said central axis;
   an endless belt running on said sheaves and presenting a grooved surface toward said drum along a helical path for confining a cable when wound about said drum along said helical path;
   said sheaves having grooved sections thereon to receive said belt, one of said sheaves having one more grooved section than the other sheaves to accommodate the opposite end loops of said belt; and
   means for driving said sheaves upon rotation of said drum.

References Cited

UNITED STATES PATENTS

| | | | |
|---|---|---|---|
| 1,931,860 | 10/1933 | Cherry | 254—175.7 |
| 2,533,592 | 12/1950 | Landon. | |
| 3,018,934 | 1/1962 | Good | 254—186 |

EVON C. BLUNK, *Primary Examiner.*

H. C. HORNSBY, *Assistant Examiner.*